Nov. 17, 1959   W. C. VIZARD   2,912,700
METHOD OF MAKING APPAREL BELTING
Filed Sept. 23, 1955   4 Sheets-Sheet 1
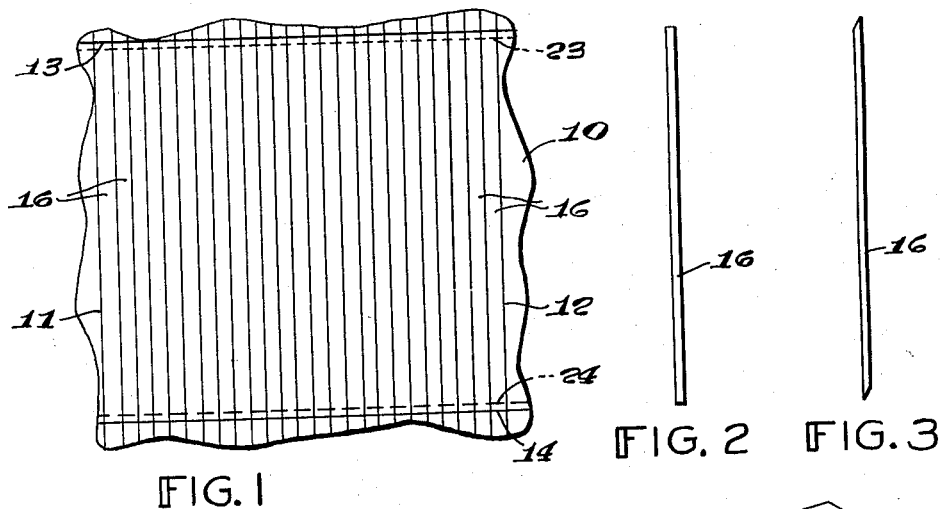
FIG. 1   FIG. 2   FIG. 3
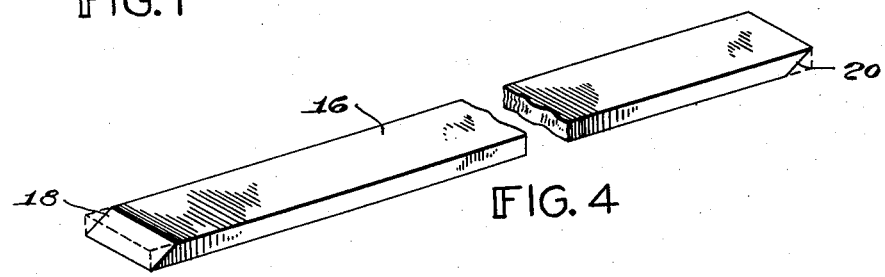
FIG. 4
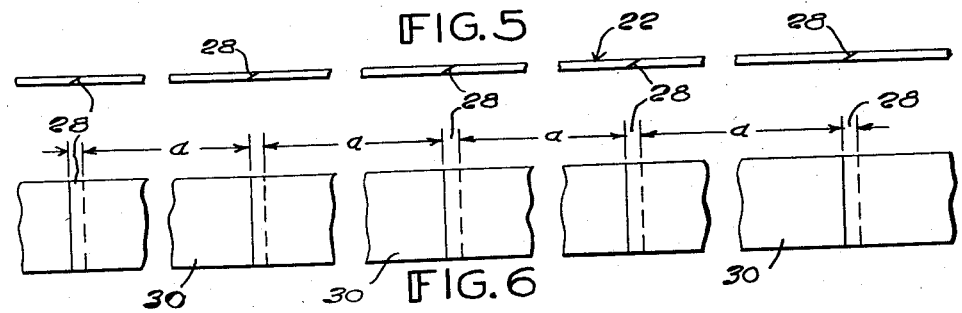
FIG. 5
FIG. 6
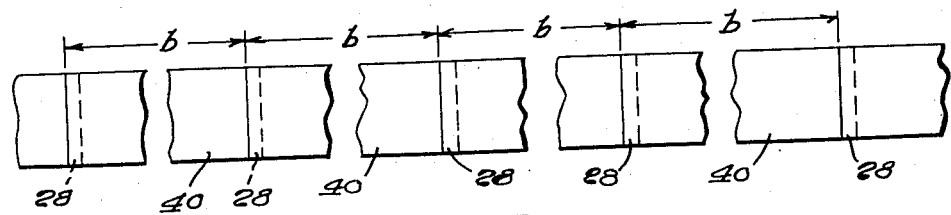
FIG. 7
INVENTOR
William C. Vizard
BY J. Stanley Churchill
ATTORNEY

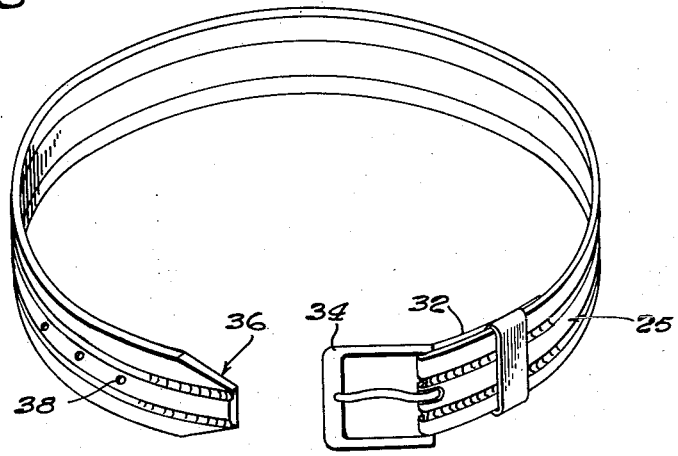
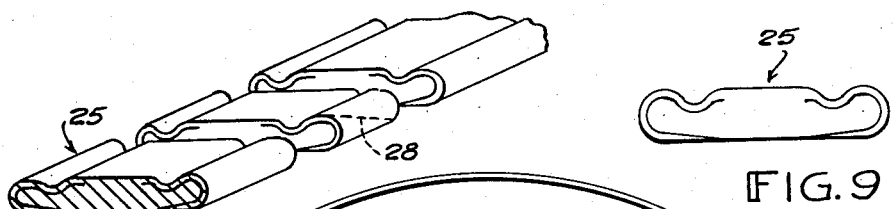
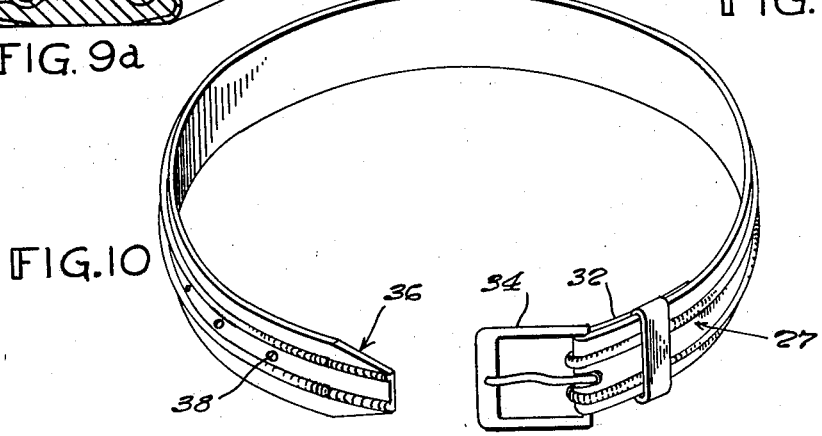
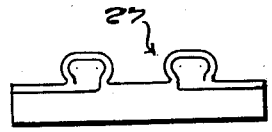

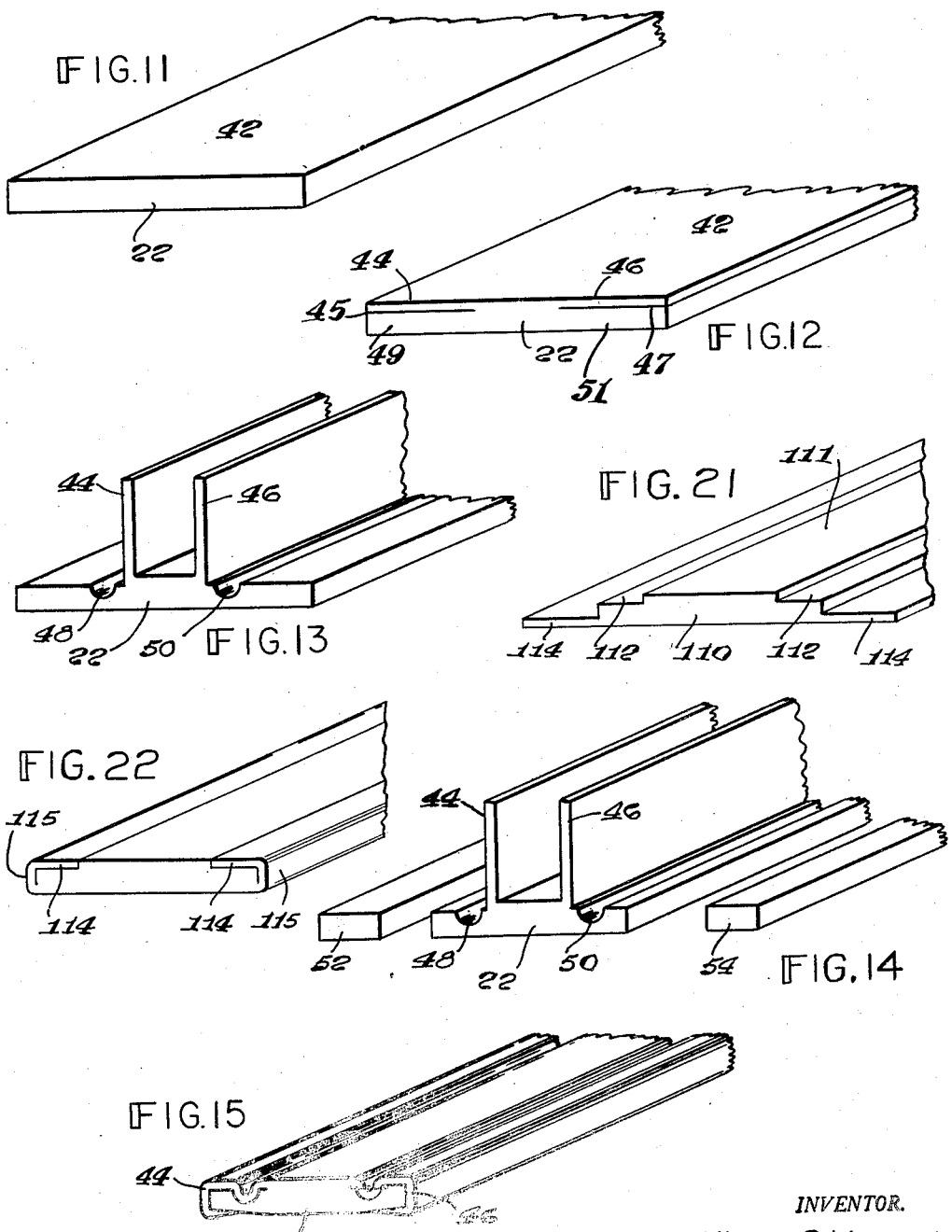

Nov. 17, 1959  W. C. VIZARD  2,912,700
METHOD OF MAKING APPAREL BELTING
Filed Sept. 23, 1955  4 Sheets-Sheet 4
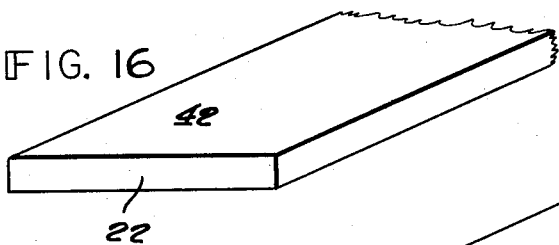
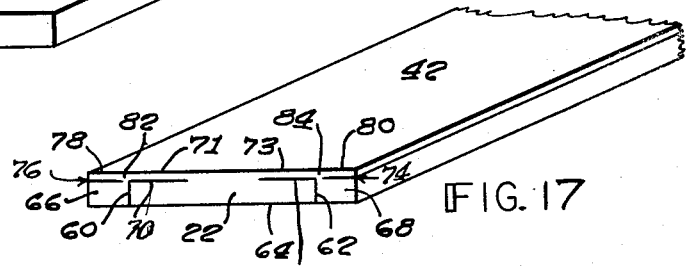
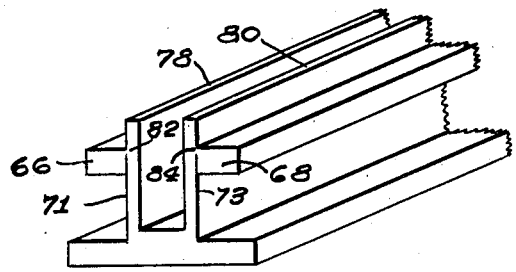
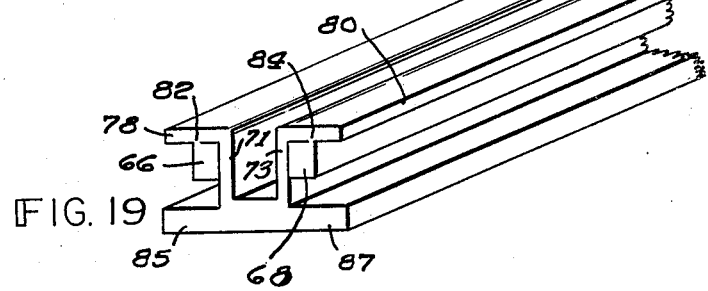
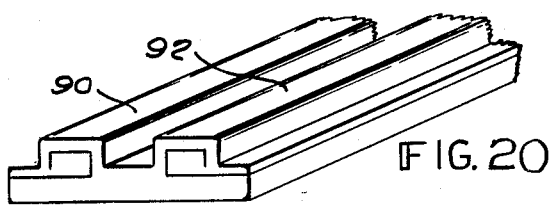
INVENTOR.
William C. Vizard
BY

United States Patent Office 2,912,700
Patented Nov. 17, 1959

2,912,700

METHOD OF MAKING APPAREL BELTING

William C. Vizard, Brockton, Mass., assignor to Barbour Welting Company, Brockton, Mass., a corporation of Massachusetts Application September 23, 1955, Serial No. 536,087

5 Claims. (Cl. 2—338)

This invention relates to methods of making apparel belting.

The invention has for an object to provide a novel method of making belting material from which a plurality of individual apparel belts may be manufactured in an economical and rapid manner.

Another object of the invention is to provide a novel method of making apparel belts in a rapid, economical and practical manner.

A still further object of the invention is to provide a novel method by which decorative apparel belts may be made in a rapid and practical manner.

A still further object of the invention is to provide a novel method of making leather apparel belts having decorative configurations on the surface thereof.

With these general objects in view and such others as may hereinafter appear, the invention consists in the method of making an extended length of belting material, and in the novel methods of making individual apparel belts, as hereinafter described and particularly defined in the claims at the end of this specification.

In the drawings illustrating the preferred embodiment of the invention:

Fig. 1 is a plan view of a sheet of grain leather from which strips of belting material may be cut in accordance with the present invention;

Fig. 2 is a side elevation of the sheet cut to form rectangular edges;

Fig. 3 is a view similar to Fig. 2 cut to form scarfed ends;

Fig. 4 is a perspective view of a strip cut from the sheet and provided with scarfed ends;

Fig. 5 is a plan view of an extended length of belting material having equally spaced scarf joints for use in producing individual apparel belts;

Fig. 6 is a front elevation of the same indicating the manner of severing the strip adjacent the scarf joints to form equal lengths of belting material;

Fig. 7 is a view similar to Fig. 6 indicating a modified method of severing the strips to form equal lengths of belting material;

Fig. 8 is a perspective view of an apparel belt formed from a strip of the present belting material having longitudinally extended configurations formed therein;

Fig. 9 is an end view of the belting material in its molded form used for making the belt shown in Fig. 8;

Fig. 9a is a perspective view of a section of the fabricated belting material shown in Fig. 9 illustrating the scarf joint removed by severance along the lines defining each side of the joint;

Fig. 9b is a similar view illustrating the line of severance along one of the lines defining the scarf joint;

Fig. 10 is a perspective view of an apparel belt made from a strip having different configurations formed therein;

Fig. 10a is an end view of the belting material used for making the belt shown in Fig. 10;

Figs. 11 to 15 are perspective views illustrating the steps in producing the belting material shown in Fig. 9;

Figs. 16 to 20 are perspective views illustrating the steps in producing the belting material shown in Fig. 10a; and Figs. 21 and 22 are perspective views illustrating the formation of another form of belting produced in accordance with the invention.

In general the present invention contemplates novel and improved methods of producing belting material for use in making decorative apparel belts and particularly those having longitudinal configurations formed therein. In the illustrated and preferred method of making the belting material, a sheet of grain leather is cut into strips of equal length and joined together to form an extended length comprising a large number of strips. The extended length is preferably formed of individual strips scarfed in opposite directions at the two ends thereof. Preferably the extended length is formed with equally spaced scarf joints. After fabrication of the extended or continuous length, the desired operations may be performed thereon by passing the length through operating tools. Thereafter the extended length of belting material may be severed on each side of and adjacent the scarf joints to remove the same, thus forming individual scarf-free strips of equal length for use in making belts of a particular size. In some instances the processed belting material may be severed along one edge only of the scarf joints in which event the scarfed end of the belting strips may be used for the buckle loop end of the belt where it will be concealed.

In practice an irregularly shaped sheet of grain leather may be first trimmed into rectangular shape so that subsequent cutting will form belting strips of equal length for use in making a particular size of belt. Thus, a larger sheet of leather may be selected to produce longer strips of equal length for use in making belts of a larger size.

The individual apparel belts produced in accordance with the invention may be either plain or decorative, and in one form of the belting material herein illustrated, the strip of grain leather is provided with a pair of integral grain surfaced covering flaps conforming and secured to longitudinally extended configurations in the form of grooves formed in the underlying portion of the strip, as shown in Fig. 9. In another embodiment of the invention the grain surfaced cover flaps are provided with integral longitudinally extended core portions hingedly connected thereto and which may be folded within the flap and secured to the underlying portions of the strip to form a belting material having spaced and longitudinally extended upstanding beads, as shown in Fig. 10a. As illustrated in Figs. 21 and 22, the present method may be used in the production of a plain belting having grain finished edges, as will be described.

Referring now to the drawings, and particularly to Fig. 1, the numeral 10 represents an irregularly shaped sheet of grain leather which in accordance with the present invention may be first trimmed along its edges to form a rectangular sheet defined by the lines 11, 12, 13, 14, and the latter may then be cut longitudinally to form a plurality of relatively narrow strips 16 of equal length, as illustrated in Fig. 2. The individual strips may then be cut to provide scarfed ends 18, 20, as shown in Fig. 4, and the scarfed ends may be placed in overlapping relation and adhesively secured to the ends of adjacent strips to form a continuous or elongated length or strip 22 of belting material having equally spaced scarf joints, as illustrated in Fig. 5. As shown in Fig. 3, and by dotted lines 23, 24 in Fig. 1, the sheet of grain leather 10 may be initially cut at a bevel to provide scarfed edges along the lines 13, 14 prior to cutting the sheet into strips, thus eliminating the scarfing operation of individual strips.

After production of the elongated or continuous length 22 of the belting material, the same may be advanced through a series of tools, such as cutting and forming tools, as well as through coloring baths, to enable such operations to be performed rapidly and economically.

The continuous strip of grain leather may then be fabricated to provide longitudinally extended configurations of various types, as indicated generally at 25, 27 in Figs. 9 and 10a respectively in a manner to be described, whereby to produce a continuous length of decorative belting material having a decorative grain surface on one side thereof and provided with equally spaced scarf joints 28. In practice the continuous strip of decorative belting material may then be severed transversely along both edges of the scarf joints, as indicated in Figs. 6 and 9a to remove the scarf joints 28 and to form individual scarf-free strips 30 of equal length indicated at "a" and from which conventional apparel belts of the type illustrated in Figs. 8 and 10 may be produced in the usual or preferred manner by folding one end upon itself to form a loop 32 for receiving the buckle 34 and by shaping the other end 36, as illustrated, and forming belt holes 38 for cooperation with the buckle 34. As illustrated in Figs. 7 and 9b, instead of severing the continuous fabricated strip along both edges of the scarf joints, the strip may be severed along one edge only of the scarf joints to provide individual belting strips 40 of equal length "b" which include the scarf joints 28. In producing apparel belts from the strips 40, it is preferred to use the scarf joint ends of the strips to form the buckle loop 32 so that the scarf joint will be concealed in the finished belt.

In practice in producing the continuous length of belting material 22, the scarf joints 28 may be made of a relatively small width, preferably between one-half and three-quarters of an inch wide. Also, in practice a sheet 10 of grain leather of a particular length is preferably selected to form equal length strips 16 for use in making belts of a particular size, other length sheets being used for forming equal length strips to make belts of other sizes.

Referring now to Figs. 11 to 15 illustrating successive steps in the method of making the decorative belting material shown in Fig. 9, a strip of belting material 22 substantially rectangular in cross section and having a grain surface 42, as shown in Fig. 11, is first slit longitudinally from each edge of the strip a short distance below the grain surface 42, the slits 45, 47 extending inwardly and terminating at points short of the longitudinal center line of the strip to form two flexible grain surfaced flaps 44, 46 hingedly connected to the strip, and two flesh base portions 49, 51 as shown in Fig. 12. The flaps 44, 46 may then be lifted to a vertical position, as shown in Fig. 13, and the underlying flesh surfaces of the strip may be cut to provide longitudinal configurations of any desired shape, herein shown as comprising grooves 48, 50. The marginal edges of the strip may then be trimmed to remove fillets 52, 54, leaving the base portion of the strip reduced in width, as shown in Fig. 14. The flexible and relatively thin hingedly connected grain flaps 44, 46 may then be folded down and cemented to the underlying configurated surfaces following the contour of the configurations. As shown in Fig. 15, the reduction in width of the base portion of the strip permits the hinged flaps 44, 46 to be extended around the trimmed edges of the strip and onto the flesh side thereof whereby to also provide grain surfaced marginal edges. The strip thus fabricated may take the general form illustrated in Figs. 9 and 15 after the usual molding operation to form a continuous decorative strip. Thereafter the strip may be severed transversely adjacent the scarf joints to form individual belt lengths in the manner previously described, thus producing decorative belting strips for use in making apparel belts having longitudinally extended grain surfaced configurations on one side and extended around the marginal edges onto the opposite side of the strip.

Referring now to Figs. 16 to 20 illustrating the successive steps in the method of making the decorative belting material shown in Fig. 10a, the strip of belting material 22 having an upper grain surface 42, as shown in Fig. 16, is cut longitudinally to provide vertical incisions 60, 62 from the flesh or underside 64, starting at a distance from each edge sufficient to form potential core portions 66, 68, the vertical incisions extending to points just below the grain surface 42. Horizontal incisions 70, 72 extend inwardly from the upper ends of the incisions 60, 62 respectively and parallel to the grain surfaces 42. The horizontal incisions terminate short of the longitudinal center line of the strip, thus providing laterally extended relatively thin grain flaps 71, 73 hingedly connected to the grain surface and having the core portions 66, 68 integral therewith. Horizontal incisions 74, 76 may then be made from each edge of the strip a short distance below the grain surface and terminating at points just short of the upper ends of the core forming incisions 60, 62 so as to provide grain surfaced marginal flaps 78, 80 and leaving hinge portions 82, 84 connecting the core portions to the underside of the hingedly connected grain flaps 71, 73, as shown in Fig. 17.

The hinged flaps 71, 73 may then be lifted to a vertical position, as shown in Fig. 18, and the integral core portions 66, 68 folded down against the vertical flaps, the core portions being rolled within the flaps 71, 73 and cemented to the underlying base portions 85, 87, as shown in Figs. 19 and 20, with the marginal grain flaps 78, 80 extended parallel to and terminating flush with the base portions, thus providing a continuous decorative strip of belting material having longitudinally extended grain surfaced configurations in the form of raised beads 90, 92 having integral core portions. The formed strip may then be molded in accordance with conventional practice to assume the general form indicated in Figs. 10a and 20. The strip may then be cut transversely adjacent the scarf joints to form individual belt lengths in the manner previously described.

As illustrated in Figs. 21 and 22, a one-piece leather belting may be produced from a grain surfaced leather strip 110 by first cutting the flesh side 111 of the strip to form two marginal recessed portions 112 and two grain surfaced folding flaps 114. The relative dimensions of each recessed portion 112 and its flap 114 may be such as to permit the flap to be folded into the position shown in Fig. 22 to provide grain finished edges 115 for the belting strip and to impart to the leather uniform thickness across the strip. Suitable cement may be used to adhere the flaps to the side edges and recessed surfaces 112.

While the preferred embodiments of the invention have been herein illustrated and described, it will be understood that the invention may be embodied in other forms within the scope of the following claims.

Having thus described the invention, what is claimed is:

1. The method of making apparel belting from an irregularly shaped sheet of grain leather comprising the steps of first trimming the edges of the sheet to form a rectangular sheet, then cutting the sheet to form a plurality of belt forming strips of equal length and uniform width, scarfing the ends of said strips and adhesively securing the scarfed ends to form an elongated continuous strip having equally spaced scarf joints and having a continuous upper grain surface, forming longitudinal cuts along the edges of the strip a short distance below and parallel to said upper surface to provide two laterally extended portions on each side, cutting one of said laterally extended portions on each side to provide longitudinally extended configurations thereon, the other laterally extended portions on each side providing relatively thin integral grain flaps, then adhesively securing the laterally extended portions together conformably to said configurations to form a decorative belting strip having grain surfaced configurations on one face thereof, and then cutting the strip transversely on each side of successive scarfed joints to remove the same and to form individual equal length joint-free strips having grain surfaced decorative configurations on one face thereof for use in making decorative apparel belts.

2. The method of making decorative apparel belting material from an elongated strip of grain leather substantially rectangular in cross section and having an upper grain surface which consists in forming longitudinal slits inwardly from each edge a short distance below the grain surface to provide two relatively thin integral grain covering flaps hingedly connected to the grain surface, lifting the flaps upwardly at right angles to the strip and cutting longitudinal configurations in the underlying flesh portions of the strip, trimming the edge portions of the strip to reduce the width thereof, and then folding and adhesively securing the integral grain flaps over said flesh portions conformably to said configurations to form a decorative belting strip having grain surfaced configurations on one face thereof.

3. The method according to claim 2 wherein the flaps are folded to extend over the edges of the strip and a short distance onto the opposite face thereof.

4. In the method of making an apparel belting, the steps comprising scarfing the ends of each of a plurality of belt forming leather strips of substantially equal length and uniform width, adhesively securing the scarfed ends of said strips to one another to form an elongated continuous strip having equally spaced scarfed joints, then cutting the elongated strip to provide an integral relatively thin grain surfaced upper flap, reducing the width of the strip beneath said flap, then folding the flap and adhering it to a portion of the flesh surface of the elongated strip, and subsequently severing the strip transversely on each side of successive scarfed joints to remove the same and to form individual joint-free strips of substantially equal length having a grain surface on one face thereof for use in making apparel belts.

5. The method of making apparel belting from an irregularly shaped sheet of grain leather comprising the steps of first trimming the edges of the sheet to form a rectangular sheet, then cutting the sheet to form a plurality of belt forming strips having scarfed ends, then adhesively securing the scarfed ends of one strip to the scarfed ends of adjacent strips to thereby form an elongated continuous strip having equally spaced scarfed joints, then finishing the elongated strip, and then severing the strip transversely on each side of successive scarfed joints to remove the same and form individual joint-free strips of substantially equal length.

References Cited in the file of this patent

UNITED STATES PATENTS

| Number | Name | Date |
|---|---|---|
| 946,844 | Keats | Jan. 18, 1910 |
| 1,674,584 | Anderson | June 19, 1928 |
| 1,862,348 | Merrick | June 7, 1932 |
| 1,963,309 | Muller | June 19, 1934 |
| 1,984,525 | Fallon | Dec. 18, 1934 |
| 2,035,671 | Sauer | Mar. 31, 1936 |
| 2,122,251 | Hartmann | June 28, 1938 |
| 2,177,785 | Pestel | Oct. 31, 1939 |
| 2,184,970 | Allen | Dec. 26, 1939 |
| 2,316,018 | Plummer | Apr. 6, 1943 |
| 2,426,435 | Chianese | Aug. 26, 1947 |
| 2,602,932 | Eaton | July 15, 1952 |

FOREIGN PATENTS

| Number | Country | Date |
|---|---|---|
| 360,046 | Great Britain | Nov. 2, 1931 |
| 1,083,167 | France | June 23, 1954 |